US009455953B2

(12) United States Patent
Liu et al.

(10) Patent No.: US 9,455,953 B2
(45) Date of Patent: Sep. 27, 2016

(54) ROUTER CHIP AND METHOD OF SELECTIVELY BLOCKING NETWORK TRAFFIC IN A ROUTER CHIP

(75) Inventors: Albert (Fang Cheng) Liu, Taiwan (TW); Ming-Yen Lin, Jhubei (TW)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 2114 days.

(21) Appl. No.: 11/546,521

(22) Filed: Oct. 11, 2006

(65) Prior Publication Data
US 2008/0092222 A1    Apr. 17, 2008

(51) Int. Cl.
*H04L 29/06* (2006.01)

(52) U.S. Cl.
CPC ........... *H04L 63/02* (2013.01); *H04L 63/1458* (2013.01); *H04L 2463/141* (2013.01)

(58) Field of Classification Search
None
See application file for complete search history.

(56) References Cited

U.S. PATENT DOCUMENTS

| | | |
|---|---|---|
| 5,640,399 A | 6/1997 | Rostoker et al. |
| 6,003,133 A * | 12/1999 | Moughanni et al. ............ 726/4 |
| 6,343,072 B1 | 1/2002 | Bechtolsheim et al. |
| 6,751,668 B1 | 6/2004 | Lin et al. |
| 7,013,482 B1 * | 3/2006 | Krumel ............................ 726/13 |
| 2002/0087882 A1 * | 7/2002 | Schneier et al. .............. 713/201 |
| 2002/0133586 A1 * | 9/2002 | Shanklin et al. ............. 709/224 |
| 2003/0065943 A1 | 4/2003 | Geis et al. |
| 2005/0021874 A1 * | 1/2005 | Georgiou et al. ............. 709/250 |
| 2005/0050364 A1 | 3/2005 | Feng |
| 2006/0080733 A1 * | 4/2006 | Khosmood et al. ........... 726/13 |
| 2006/0117126 A1 | 6/2006 | Leung, Jr. et al. |
| 2006/0225134 A1 * | 10/2006 | Conti ............................... 726/22 |
| 2008/0005307 A1 * | 1/2008 | Byrd et al. .................... 709/223 |
| 2008/0005798 A1 * | 1/2008 | Ross ............................... 726/26 |

OTHER PUBLICATIONS

Desposito, Joe, "Router-On-A-Chip Manages Network Traffic with Wire-Speed QoS," May 1, 2000, Electronic Design.*
http://searchnetworking.techtarget.com/definition/packet-filtering.*
http://www.webopedia.com/TERM/P/packet_filtering.html.*

* cited by examiner

*Primary Examiner* — Kaveh Abrishamkar
(74) *Attorney, Agent, or Firm* — Eschweiler & Associates, LLC

(57) ABSTRACT

A router chip is proposed which comprises a central processing unit, a plurality of network interface circuitry, and a firewall circuitry coupled between the plurality of network interface circuits and the central processing unit to selectively block network traffic.

31 Claims, 5 Drawing Sheets

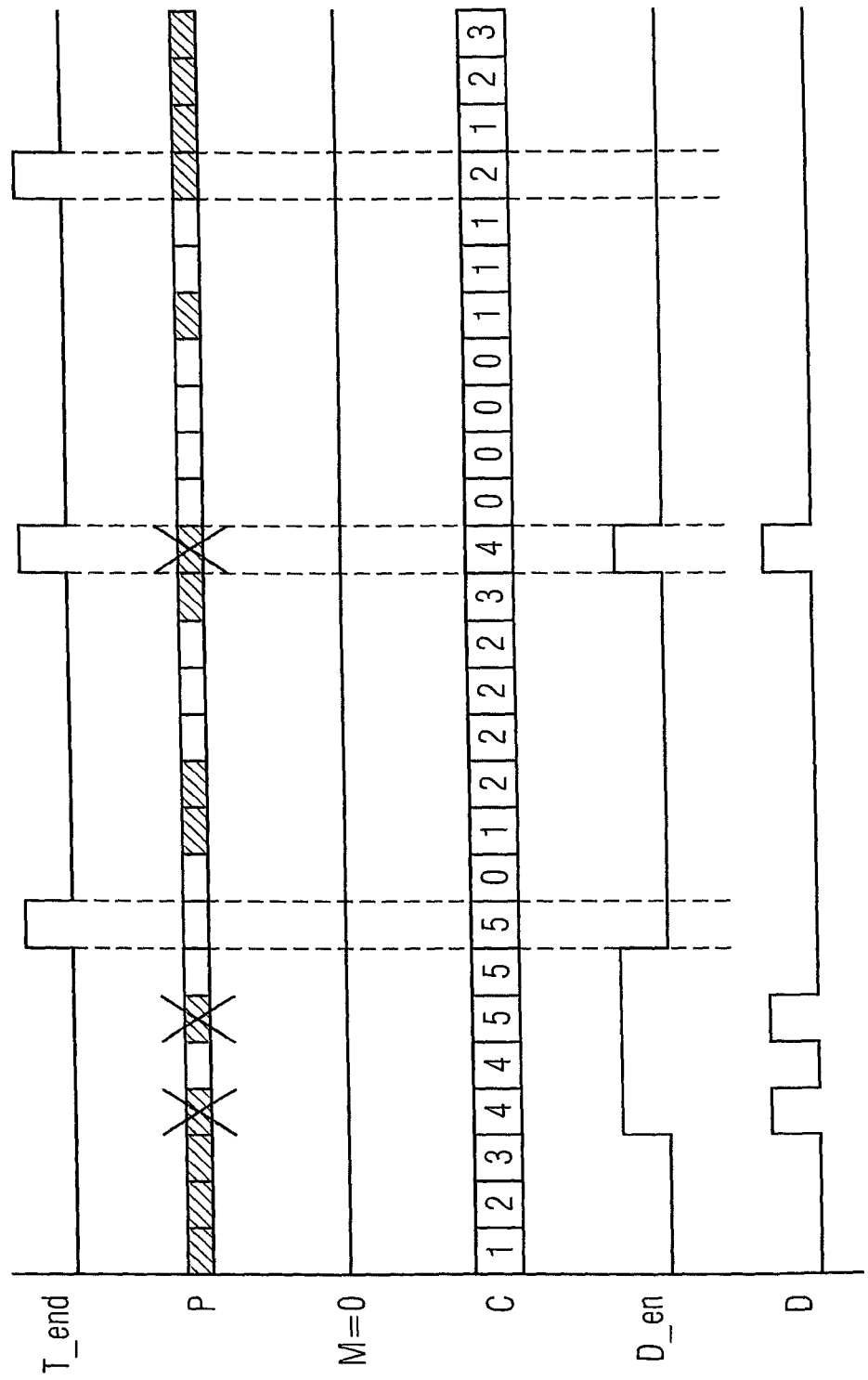

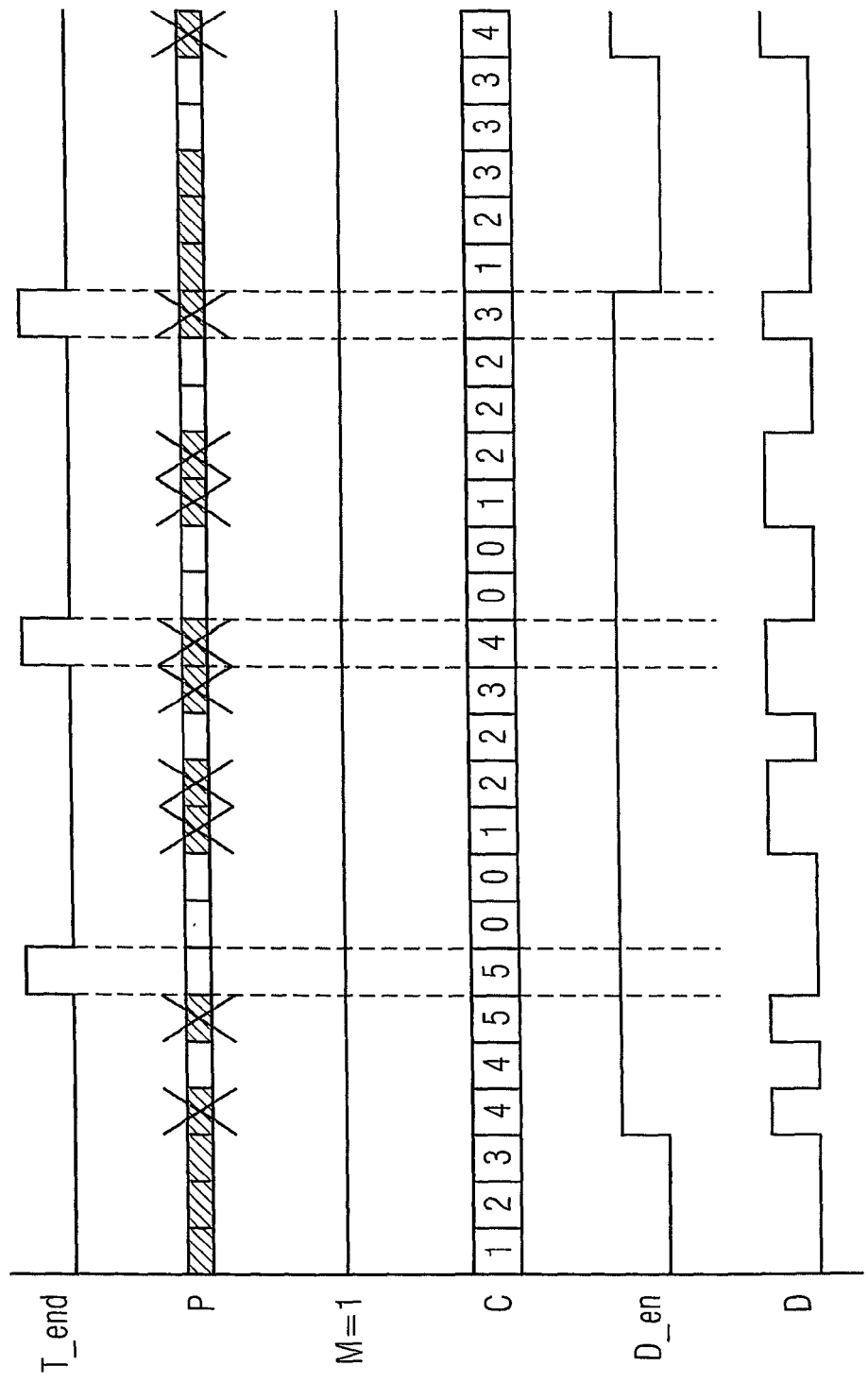

Figure 1:
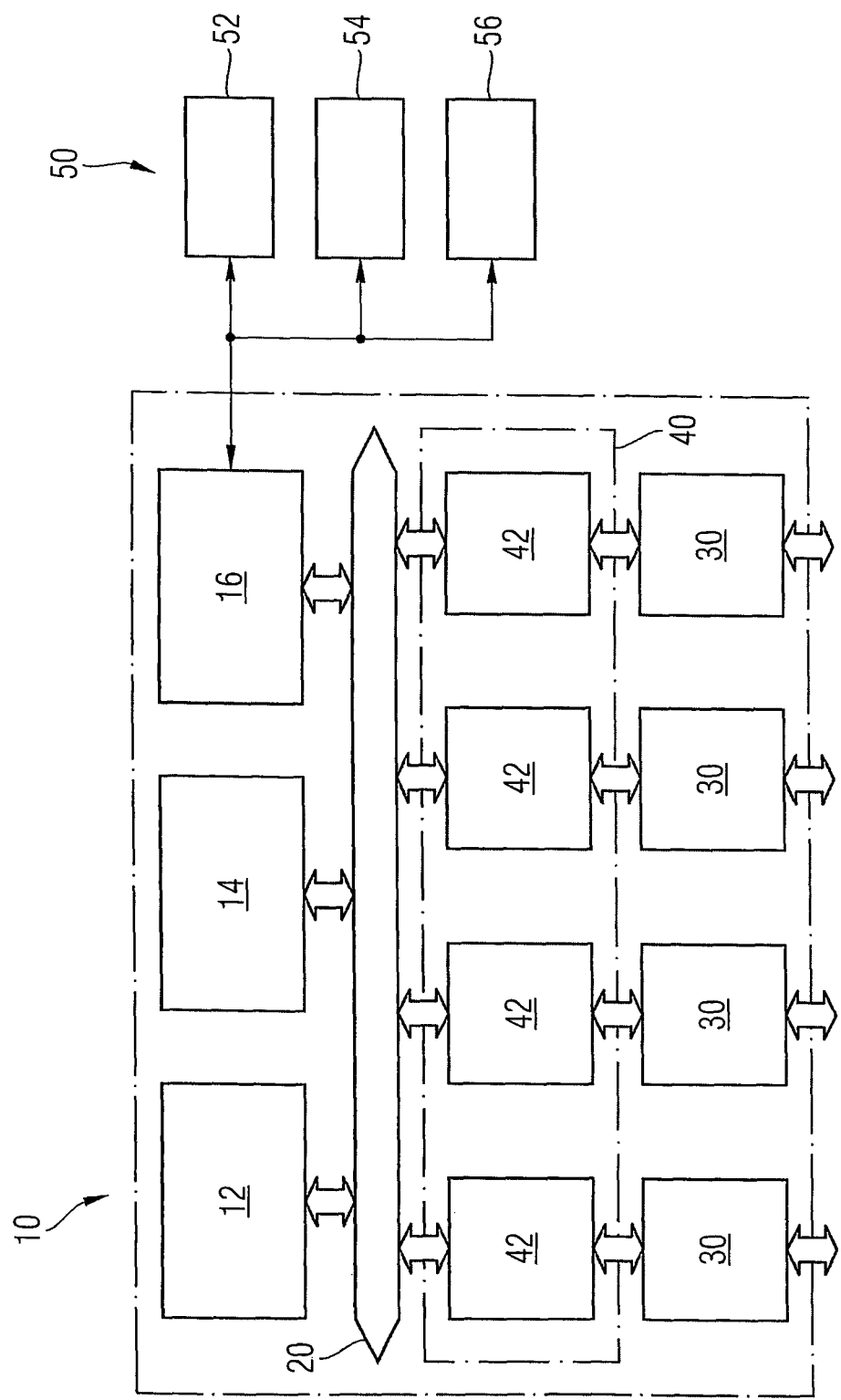

ROUTER CHIP AND METHOD OF SELECTIVELY BLOCKING NETWORK TRAFFIC IN A ROUTER CHIP

BACKGROUND OF THE INVENTION

The present application relates to a router chip and a method of selectively blocking network traffic in a router chip.

In today's internet communication networks, data packets are transmitted in data packets according to a specific networking protocol, such as the internet protocol (IP) known as IPv4 (Internet Protocol version 4) and IPv6 (Internet Protocol version 6) and the transmission control protocol (TCP). Both the IPv4 and the IPv6 correspond to a multi-layer networking protocol, which according to the OSI model comprises four layers. Transmission of the data packets occurs via so-called "router" apparatuses which have a plurality of network connections and forward a data packet, which is received on one of the network connections, to another network connection or to a plurality of network connections. This is accomplished on the basis of address information contained in the data packet and on the basis of routing information stored in a routing table of the router apparatus. For implementing these functions, a router apparatus is typically provided with a plurality of network interface circuits for receiving and transmitting data packets and a central processing unit (CPU) for performing the necessary processing of the data packets. The routing table and other processing data are stored in a memory of the router apparatus.

For implementing a router apparatus of the above-mentioned type, it is known to use router chips of the SOC type, in which at least the network interface circuits and the central processing unit are implemented on a single semiconductor chip. In these router chips, the embedded central processing unit has a computation power which is adapted to the necessary processing for routing the data packets.

In the above-mentioned internet communication networks of so-called Denial of Service attacks (DoS attacks) may occur, i.e. attacks using a lot of manipulated data packets (e.g. by a hacker) that cost a receiving host computation power to handle. A DoS attack can destroy the programming and the files in a computer system. Although a DoS attack is a type of security breach in a computer system that usually does not result in the theft of information or other security losses, DoS attacks can cost the target person or company time and money.

In the following, some common types of DoS attacks will be described.

A type of DoS attack in which a large number of TCP SYN packets (a TCP SYN packet is the first packet in a TCP/IP connection) are sent to a target, is referred to as a "SYN flood". Usually, a source IP address of the data packets is spoofed. According to the three-way handshake of the TCP/IP networking protocol, the target system replies with the corresponding ACK packets and waits for the final packet of the TCP/IP three-way handshake. If the source IP address of the initial TCP SYN packet was spoofed, the target will never receive the final packet, leaving it to hold TCP/IP sessions open until they time out. A SYN flood causes so many open TCP/IP sessions that the target system cannot handle any more network traffic.

A type of DoS attack in which an attacker sends large quantities of so-called ICMP echo (ping) requests to an IP broadcast destination address with a spoofed source address is referred to as a "Smurf attack". Most network hosts will respond with an echo reply causing a massive traffic jam.

An attack which involves sending very large ping packets to a victim system is referred to as a "Ping-of-Death" attack. When receiving a Ping-of-Death, the victim system will crash or hang because there is not enough memory to process the packet.

If an attacker puts a confusing offset value in the second or a later fragment of an IP data packet, this is referred to as a "Teardrop attack". Due to the offset, the receiving system may crash.

If an attacker utilizes a spoofed data packet in which the SYN bit is set and the source/destination addresses match those of the target system, this is referred to as a "Land attack".

If a range of IP addresses is scanned so as to show which IP addresses are in use and which ones are not, this is referred to as a "Ping Sweep".

If an attacker sends massages to a target system with an IP address indicating that the massage is coming from a trusted host, this is referred to as "IP spoofing".

A further type of DoS attack involves sending IP data packets with zero length and may be referred to as "Zero-Length attack". That is to say, the length of a header in the data packet corresponds to the total length of the data packet. If in such a data packet a bit of the first fragment indicating whether the data packet comprises more fragments is manipulated and decoy packets are appended, the target system can be caused to assemble malicious packets.

A DoS attack which causes vulnerable systems to continuously bounce data packets and thereby tie up the CPU and network resources is referred to as a "Snork attack".

Generally, all the above-mentioned types and other types of DoS attacks attempt to make a target system unavailable to its intended users. If multiple compromised systems flood the bandwidth or resources of a target system, this is referred to as a Distributed Denial of Service attack (DDoS attack).

In a router chip of the SOC type, the embedded CPU typically does not have the computation power to handle DoS or DDoS attacks. Therefore, a router apparatus using the router chip can easily become overwhelmed in a DoS or DDoS attack.

SUMMARY

According to at least some embodiments, the present invention provides a router chip which offers improved characteristics with respect to DoS and DDoS attacks.

A first embodiment of the invention is a router chip that includes a central processing unit, a plurality of network interface circuits, and firewall circuitry. The firewall circuitry is coupled between the plurality of interface circuits and the central processing unit, and is configured to selectively block network traffic.

According to an exemplary embodiment, the router chip is of the SOC type. Accordingly, with the firewall circuitry there is a dedicated hardware component in the router chip, which can help the embedded CPU to handle a DoS or DDoS attack without excessively using computation power of the CPU. For this purpose, the firewall circuitry can be specifically configured to recognize and block DoS or DDoS data packets.

The above-described features and advantages, as well as others, will become more readily apparent to those of ordinary skill in the art by reference to the following detailed description and accompanying drawings.

BRIEF DESCRIPTION OF THE SEVERAL VIEWS OF THE DRAWING(S)

FIG. 1 is a schematic illustration of a router apparatus comprising a router chip and a memory, according to an embodiment of the invention.

Figure 2:
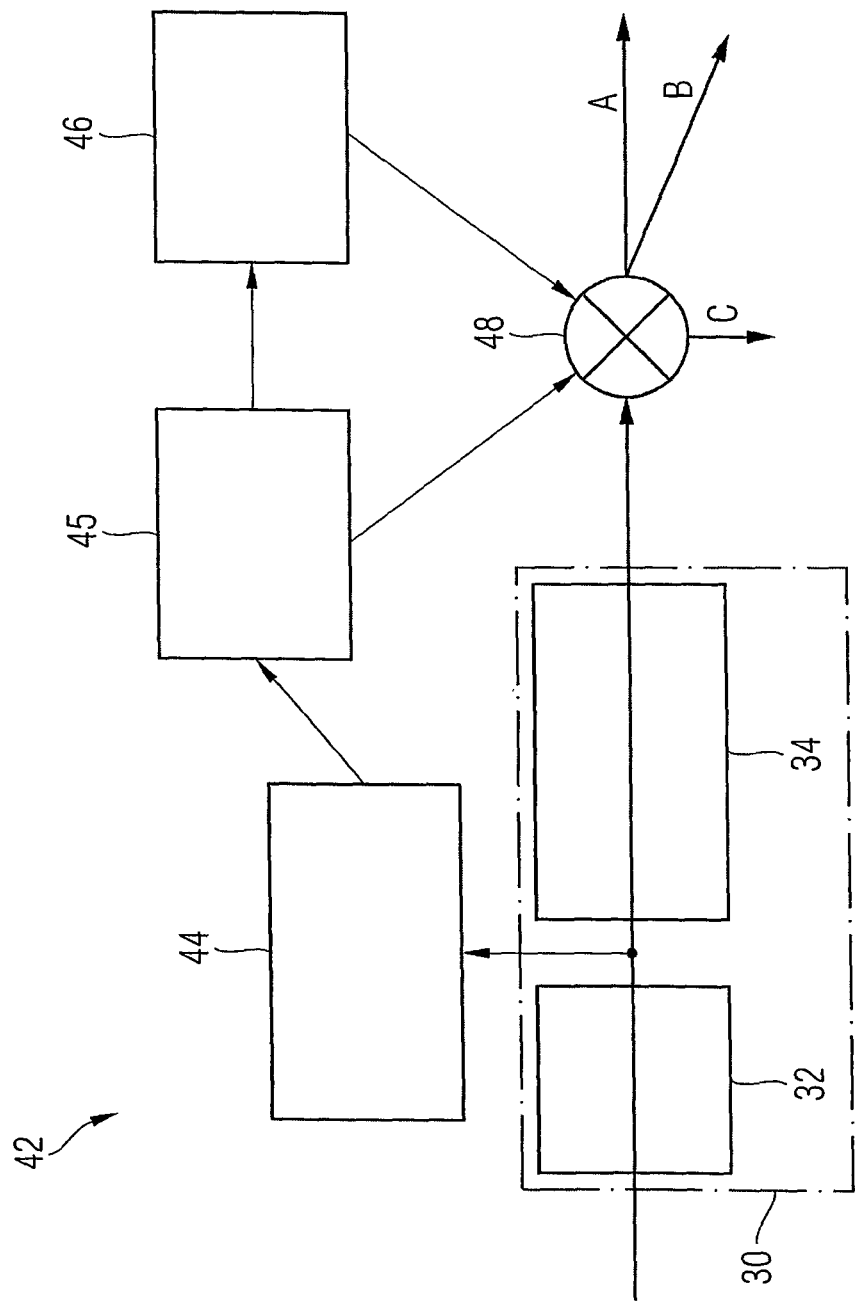

FIG. 2 schematically illustrates a firewall circuit within the router chip according to the embodiment.

Figure 3:
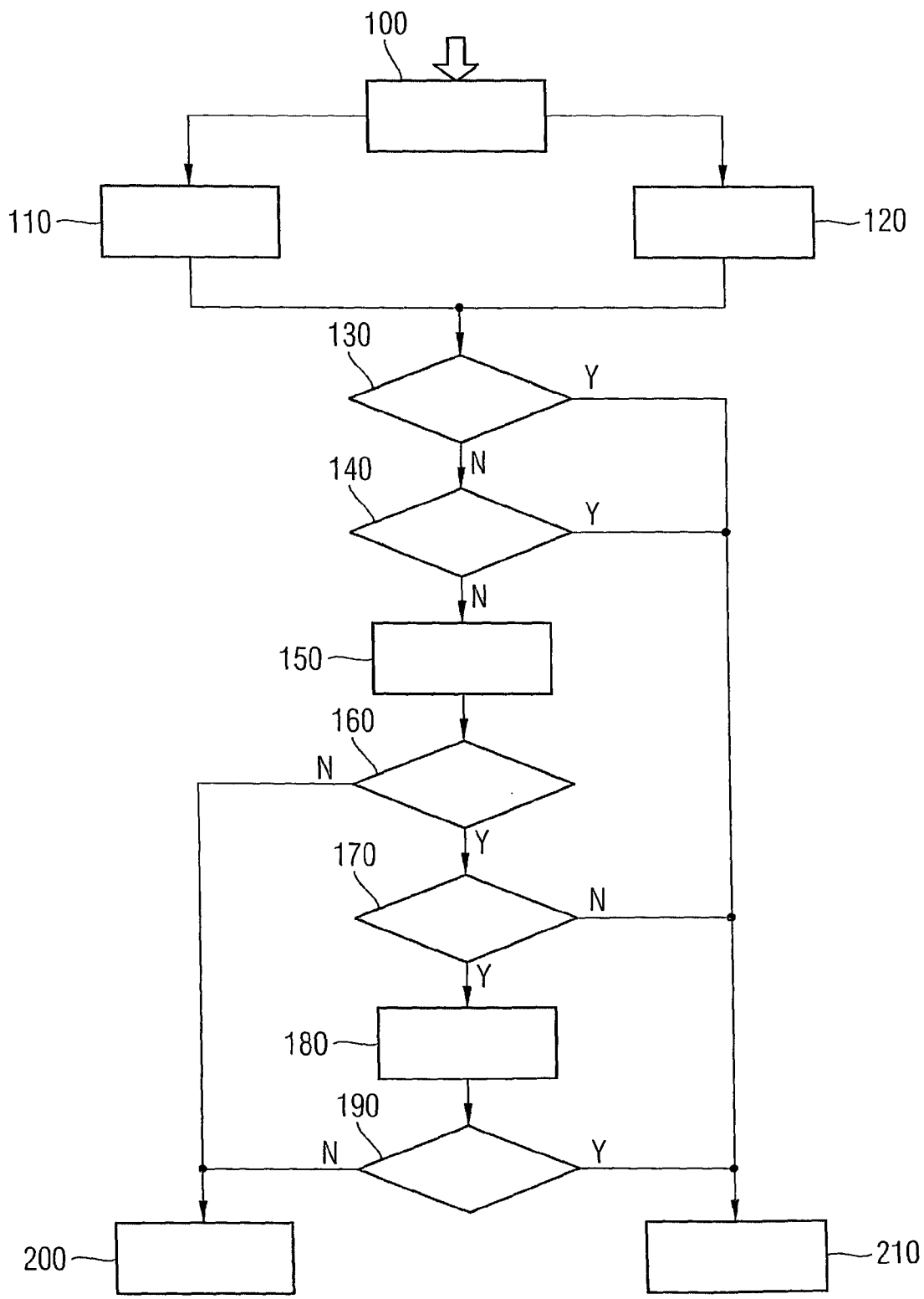

FIG. 3 shows a flowchart illustrating a method of selectively blocking network traffic according to an embodiment of the invention.

FIG. 4 schematically illustrates a flow of data packets which are processed in a first operating mode of a rate-based processing method according to an embodiment of the invention.

FIG. 5 schematically illustrates a flow of data packets which are processed in a second operating mode of a rate-based processing method according to an embodiment of the invention.

DETAILED DESCRIPTION OF THE INVENTION

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described hereinafter.

It is to be understood that in the following detailed description of exemplary embodiments any shown or described direct connection or coupling between two circuit points, functional blocks, devices or other physical or functional units could also be implemented by indirect connection or coupling.

In the following, embodiments of the invention will be described with reference to the accompanying drawings. The embodiments described hereinafter relate to a router chip of the so-called system-on-chip type (SOC type) and a router apparatus using the router chip to process network traffic. The router chip and the router apparatus may be used for directing data packets in internet applications.

According to an embodiment, the router chip comprises a CPU, a plurality of network interface circuits and a firewall circuitry coupled between the plurality of interface circuits and the central processing unit to selectively block network traffic. These components are implemented on a single semiconductor chip, i.e. the router chip is of the SOC type. Accordingly, with the firewall circuitry there is a dedicated hardware component in the router chip, which can help the embedded CPU to handle a DoS or DDoS attack without excessively using computation power of the CPU. For this purpose, the firewall circuitry can be specifically configured to recognize and block DoS or DDoS data packets.

An internal memory of the router chip can be used to store a firewall table of the firewall circuitry. By analyzing received data packets so as to determine predefined portions of the data packets, e.g. MAC address, IP address, port number or packet header content, and comparing the predefined portions of the data packets with entries of the firewall table, the firewall circuitry can determine if a received data packet matches a predefined firewall constraint. According to an embodiment, the firewall table can be programmed by the CPU.

According to a further embodiment of the invention, a method of selectively blocking network traffic in a router chip is provided. The router chip may of the above-mentioned type, i.e. comprise a CPU and a plurality of network interface circuits. In particular, the method involves providing a firewall circuitry coupled between the plurality of network interface circuits and the CPU. The firewall circuitry is a separate hardware component which may be used to save computation power of the CPU by selectively forwarding a received data packet or discarding the received data packet.

According to an embodiment, the method also involves analyzing the received data packets by means of a network protocol parser so as to determine predefined portions of the data packets and evaluating the predefined portions of the data packets so as to determine if a received data packet matches a predefined firewall constraint. For this purpose, the predefined portions of the data packets may be compared with entries of a firewall table. According to an embodiment, the firewall table can be programmed by the CPU. The firewall table may be stored in an internal memory of the firewall circuitry in an on-chip memory of the router chip, or in an external memory.

According to an embodiment, a rate-based method is used to recognize and handle DoS or DDoS attacks. The rate-based method involves counting the number of data packets matching a predefined firewall constraint so as to determine a count of matching data packets and controlling the selective forwarding or discarding of data packets depending on the count of matching data packets.

In an embodiment, the rate-based method is implemented with multiple operating modes. According to a first operating mode, a data packet is discarded if the data packet matches the predefined firewall constraint and if the count of matching data packets in the presently evaluated time interval exceeds a predetermined threshold. Other data packets are forwarded to the CPU. In this way, it is possible for the CPU to further analyze the data packets which match the predefined firewall constraint. In this way, it can be avoided that data packets are wrongly discarded, and the analysis of the data packets may be used as a basis for programming the firewall table. According to a second operating mode, the rate-based method additionally or alternatively involves discarding a data packet if the data packet matches the predefined firewall constraint and if the count of matching data packets in the previously evaluated time interval exceeds a predetermined threshold. In this way, more computation power of the CPU can be saved if a lot of data packets matching the predefined firewall constraint are received.

The above-mentioned rate-based method allows for significantly reducing the load on the CPU in a DoS or DDoS attack, but still allows for monitoring the network traffic by means of the CPU.

It is to be understood, that actually a plurality of predefined firewall constraints may be provided and that the processing of a received data packet is accomplished according to the type of matching firewall constraint. For certain firewall constraints, it is possible to directly discard a data packet if it matches a specific predefined firewall constraint, without using the above-mentioned rate-based method.

According to a further embodiment, a router apparatus is provided which comprises a router chip as described above. In addition to the router chip, the router apparatus comprises a memory which is external with respect to the router chip. The type and size of the memory may be suitably selected and may, for example, be a flash memory, a NAND flash memory, or a SDRAM memory.

In the following, more detailed explanations will be made with reference to the accompanying drawings.

FIG. 1 schematically illustrates a router apparatus according to an embodiment of the invention. The router apparatus comprises a router chip 10 and a memory device 50. The memory device 50 stores processing data of the router chip 10, e.g. routing table data. The memory device 50 may include different types of memory: a NAND flash memory 52, a flash memory 54, or an SDRAM memory 56. Different combinations of the above-mentioned types of memory may be provided.

The router chip 10 comprises a plurality of network interface circuits 30 which provide external network connections. The network interface circuits 30 may actually comprise different types of media access control devices (MAC devices), in accordance with the type of network connection. For example, a MAC device according to the IEEE 802.3 specification may be provided for a wired network connection, and a MAC device according to the IEEE 802.11 specification may be provided for a wireless connection.

The network interface circuits 30 are coupled to a data bus 20 via a firewall circuitry 40. The firewall circuitry 40 comprises a firewall circuit 42 for each of the network interface circuits. That is to say, a firewall circuit 42 is coupled between each of the network interface circuits 30 and the data bus 20.

The router chip 10 further comprises an internal memory 12, a CPU 14 and a memory controller 16, each coupled to the data bus 20.

The memory controller 16 provides access to the external memory device 50. The central processing unit 14 performs the essential processing for routing data packets via the network interface circuits 30, i.e. analyzing data packets, controlling the forwarding of data packets according to entries stored in a routing table, assembling data packets, disassembling data packets, and programming entries of the routing table. The on-chip memory 12 is used for temporarily storing processing data.

As illustrated in FIG. 1, the firewall circuitry 40 is coupled between the network interface circuits 30 and the CPU 14. The firewall circuitry 40 is configured to recognize a DoS or DDoS attack and to selectively block data packets of a DoS or DDoS attack. This is accomplished by the firewall circuits 42 coupled between each of the network interface circuits 30 and the data bus 20. That is to say, the firewall circuits 42 selectively forward or discard a data packet received via a network connection depending on whether or not the data packets matches a predefined firewall constraint.

A number of predefined firewall constraints are defined using the firewall table. According to an embodiment, the firewall table is stored in an internal memory of the firewall circuits 42 and may be extended to the on-chip memory 12 or to the external memory 50. In other embodiments, the firewall table may be stored in the on-chip memory 12 of the router chip 10 or in the external memory device 50. The on-chip memory 12 can be accessed by the firewall circuits 42 via a data bus 20. The external memory device 50 can be accessed by the firewall circuits 42 via the data bus 20 and the memory controller 16. Thus, there exist different possibilities of storing the firewall table which may be suitably combined with each other. Using the internal memory of the firewall circuits 42 for storing frequently matched constraints may offer a high throughput and efficient processing. Using the on-chip memory 12 or the external memory 50 may offer a high flexibility and reduced hardware outlay, in particular when storing large numbers of firewall constraints. Also, it may be advantageous in view of efficient memory use if firewall table data and processing data of the CPU are stored in the same memory, i.e. a common memory, which may be the on-chip memory 12 or the external memory 50. According to an embodiment, only a number, e.g. 128, of the most frequently matched firewall constraints is stored in the internal memory of the firewall circuits 42.

In the illustrated example, the firewall circuitry 40 is configured to recognize and selectively block IPv4 and IPv6 data packets belonging to the following type of DoS or DDoS attack: SYN flood, Smurf attack, Ping-of-Death, Teardrop attack, Land attack, Ping Sweep, IP spoofing, Zero-Length attack, or Snork attack. Further, the firewall circuitry 40 can block data packets belonging to specific applications like FTP, TFTP, etc.

The firewall table comprises entries concerning the following: source and destination MAC address, source and destination IP address, source and destination port number, layer 4 protocol type (e.g. ICMP, TCP, UDP), layer 4 header flags check. Further, the firewall table comprises entries which define an operating mode of a rate-based evaluation unit of the firewall circuits 42, which will be further described below. Each of the entries in the firewall table can be programmed by the CPU 14.

FIG. 2 schematically illustrates the structure of one of the firewall circuits 42 in the router chip 10 of FIG. 1. The data flow of incoming data packets is illustrated in the lower portion of FIG. 2. The network interface circuit 30 receives incoming data packets as illustrated by the horizontal arrow. The data packets are received by a MAC device 32 and then passed to a buffer 34 which is of the first-in-first-out type. From the buffer 34, the data packets are forwarded to a decision node 48 of the firewall circuit 42. Depending on control signals of the firewall circuit 42, the decision node 48 can forward the data packet to the CPU 14 as illustrated by arrow A, can forward the data packet to an alternative hardware path as illustrated by arrow B, or can discard the data packet as illustrated by arrow C.

In the following, the operation of the firewall circuit 42 so as to generate the control signals for the decision node 48 will be further explained.

The firewall circuit 42 comprises a network protocol parser 44 which analyzes the data packets of incoming network traffic. For this purpose, the network protocol parser 44 is connected to a node between the MAC device 32 and the buffer 34.

The protocol parser 44 comprises a substructure for analyzing data packets of the IPv4 type and a substructure for analyzing data packets of the IPv6 type. In the embodiment, the protocol parser 44 is configured to analyze the data packets up to the third layer of the multi-layer networking protocol. In this way, information can be extracted from the data packets, which is valuable for recognizing a DoS or a DDoS attack. By excluding the fourth layer from the evaluation, the processing in the firewall circuit 42 is kept at an acceptable level. In particular, a relatively simple structure of the firewall circuit 42 is sufficient to perform the necessary computations. According to an embodiment, it is also possible to include a different number of layers into the analysis, e.g. four layers or less than three layers.

The protocol parser 44 determines parameters and information which are stored in predefined portions of the data packets. In particular, the network protocol parser 44 analyzes the data packets with respect to source and destination MAC address, source and destination IP address, port number and header content.

The results of the analysis are supplied to a table search unit 45, which evaluates whether or not the data packet matches a predefined firewall constraint. For this purpose, the table search unit 45 compares the information obtained by the network protocol parser 44 with entries of the firewall table. It is to be understood that a plurality of firewall constraints can be defined in the firewall table. As mentioned above, other memories, e.g. the on-chip memory 12 or the external memory 50 may be used to store the firewall table.

Further, firewall constraints can be defined which can be checked merely on the basis of the information obtained by the network protocol parser 44, without referring to the firewall table. For example, a Land attack can be identified by checking if a destination address defined in the data packet is the same as a source address defined in the data packet. A Zero-Length attack can be identified by checking if a header length of the data packet corresponds to the total length of the data packet and if a bit in the data packet indicating whether the data packet contains more fragments is set. In such cases, the table search unit 45 generates a control signal which causes the decision node 48 to discard the corresponding data packet.

As already mentioned above, a plurality of firewall constraints may be checked by comparing the information obtained by means of the network protocol parser 44 with entries of the firewall table. The table search unit 45 is configured in such a way that, for certain firewall constraints, a control signal is generated that causes the decision node 48 to discard the data packet if the comparison with the entries of the firewall table indicates that the corresponding data packet matches a firewall constraint. For other firewall constraints, the data packets are not directly discarded, but a rate-based evaluation unit 46 of the firewall circuit 42 is activated.

In general terms, the rate-based evaluation unit 46 operates in such a way that at least some of the data packets matching a specific firewall constraint are forwarded to the CPU 14, depending on the rate at which they occur in the incoming network traffic. According to the illustrated example, the rate-based evaluation unit 46 is activated for firewall constraints corresponding to a SYN flood, a Ping-of-Death, a Teardrop attack, or an IP spoofing attack. However, other embodiments may include other DoS or DDoS attacks. The detailed operation of the rate-based evaluation unit 46 will be further explained below.

FIG. 3 shows a flowchart which illustrates a method of selectively blocking network traffic during operation of the firewall circuit 42.

In step 100, it is checked whether a received data packet is an IPv4 data packet or an IPv6 data packet. For an IPv4 data packet, the method continues with step 110, and for an IPv6 data packet, the method continues with step 120.

In step 110, the data packet is analyzed by means of the IPv4 parsing substructure of the network protocol parser 44. In step 120, the data packet is analyzed by means of the IPv6 parsing substructure of the network protocol parser 44. After analyzing the data packet in step 110 or step 120, the method continues with step 130.

In step 130, it is checked whether the data packet matches a firewall constraint corresponding to a Land attack. In particular, it is checked if a destination address (MAC or IP) defined in the data packet corresponds to a source address (MAC or IP) defined in the data packet. If this is the case, the data packet is identified as a Land attack data packet, and the method continues with step 210 in which the data packet is discarded. Otherwise, the method continues with step 140.

In step 140, it is checked if the data packet matches a firewall constraint corresponding to a Zero-Length attack. This is accomplished by detecting if the header length of the data packet corresponds to the total length of the data packet and if a bit of the data packet indicating that more fragments are included is set. If this is the case, the method continues with step 210, and the data packet is discarded. Otherwise, the method continues with step 150.

In step 150, a table search procedure is carried out. In step 160, it is determined if information fields determined by the network protocol parser 44 correspond to entries of the firewall table. If this is not the case, the method continues with step 200 and the data packet is forwarded to the CPU 14 or to another hardware path. If a matching entry of the firewall table is found, the method continues with step 170.

In step 170, it is checked if the firewall constraint corresponding to the matching entry of the firewall table requires further evaluation by the rate-based evaluation unit 46. This may be accomplished on the basis of a flag or indicator in the firewall table. If no rate-based evaluation is required, the method continues with step 210, and the data packet is directly discarded. Otherwise, the method continues with step 180.

In step 180, a rate-based evaluation is carried out. In particular, it is checked at which rate data packets matching the firewall constraint occur. Generally, this is accomplished by counting the data packets matching the firewall constraint in a predefined time interval. After determining the rate of data packets matching the firewall constraint, the method continues with step 190.

In step 190, it is checked if the rate determined in step 180 meets predefined threshold conditions. If this is the case, the method continues with step 210, and the data packet is discarded. Otherwise, the method continues with step 200, and the data packet is forwarded to the CPU 14 to be further processed.

As can be seen from the above explanations, the method allows for forwarding certain data packets to the CPU 14 even if they match a firewall constraint. In this way, it is possible that the CPU 14 further analyzes the data packets and then eventually decides whether the data packet should be discarded or not. Further, the CPU 14 may monitor the data packets matching a firewall constraint and modify the firewall table according to the results of the analysis. For example, firewall constraints may be added or deleted, or parameter ranges in the firewall constraints may be adjusted. As only a fraction of the data packets to be discarded actually reaches the CPU 14, the analysis and monitoring does not require excessive computation power.

In the following, the rate-based evaluation will be further explained with reference to FIGS. 4 and 5.

Generally, the rate-based evaluation methods described herein are based on a user-defined threshold rate. According to the illustrated example, one of two rate-based evaluation methods can be selected via a corresponding entry in the firewall table. According to a first operating mode, the first packets in a predefined time interval which match one of the firewall constraints can still be observed by the CPU 14, until a threshold value is reached. In a second operating mode, the first packets matching one of the firewall constraints in a time interval can only be observed by the CPU 14 if a threshold rate was not reached in the previously evaluated time interval.

FIG. 4 illustrates an exemplary flow of data packets and control signals in the rate-based evaluation method according to the first operating mode.

The rate-based evaluation unit 46 comprises a counter for each of the firewall constraints. The counter is periodically reset, thereby defining a sequence of time intervals. This is controlled by means of a timer signal T_end, illustrated as the uppermost signal in FIG. 4. As illustrated, the signal T_end is periodically activated, the beginning of a new time interval being defined when the signal T_end is brought back into its deactivated state.

Below the signal T_end, an exemplary sequence of data packets is illustrated and designated by P. Data packets matching the firewall constraint are hatched. Data packets which are discarded according to the rate-based method are crossed out.

Below the sequence of data packets, a mode selection signal M is illustrated. In FIG. 4, the mode selection signal has a value M=0, which causes the rate-based evaluation unit 46 to operate according to the first operating mode.

Below the mode selection signal M, values of a counter C are illustrated. The counter C counts the number of data packets which match the firewall constraint. The counter is reset by changing the control signal T_end from its activated state to its deactivated state.

Below the counter C, a signal D_en is illustrated, which enables the discarding of data packets if the data packet matches the firewall constraint. The signal D_en is controlled depending on the value of the counter C. In particular, the value of the counter C is compared to a threshold value, which in the illustrated example is C=3. If the counter C exceeds the threshold value of C=3, the signal D_en is switched from its deactivated state into its activated state, thereby enabling the discarding of data packets matching the firewall constraint. If the signal D_en is not active, data packets which match the firewall constraint are not discarded, but forwarded to the CPU 14 to be further analyzed and monitored.

Below the signal D_en, a discard control signal D is illustrated. By activating the discard control signal D, the data packet is discarded at the decision node 48 illustrated in FIG. 2.

As can be seen in the example of FIG. 4, in the first time interval, the fourth and sixth data packets are discarded as they match the firewall constraint and the value of the counter C exceeds the threshold value of C=3. The first three data packets match the firewall constraint, but are still forwarded to the CPU 14 as the counter has not yet exceeded the threshold value. According to the same rules, in the second time interval only the last data packet is discarded, and in the third time interval no data packet is discarded.

FIG. 5 illustrates an exemplary flow of data packets and control signals in the rate-based evaluation method according to the second operating mode.

The signals and designations are generally the same as in FIG. 4. However, as compared to FIG. 4, the mode select signal M has the value M=1, which causes the rate-based evaluation unit 46 to operate according to its second operating mode. In the second operating mode, different conditions are imposed to generate the signal D_en. These conditions are the following: As in the case of FIG. 4, the signal D_en is activated if in the presently evaluated time interval the value of the counter C exceeds the threshold value of C=3. However, the signal D_en is also activated if in the previously evaluated time interval the counter has exceeded the threshold value of C=3. In other words, the signal D_en is kept active until there is a time interval in which the value of the counter C does not exceed the threshold value of C=3.

As can be seen in the example of FIG. 5, the fourth and sixth data packets in the first time interval are discarded. The first three data packets in the first time interval meet the firewall constraint, but are still forwarded to the CPU 14 as the counter C has not yet exceeded the threshold value of C=3. In the second time interval, all data packets matching the firewall constraint are discarded, as in the first time interval the counter C has exceeded the threshold value of C=3. As illustrated, the counter C exceeds the threshold value of C=3 also in the second time interval. Therefore, the signal D_en is kept active also in the third time interval. However, in the third time interval, the threshold value of C=3 is not exceeded. Therefore, the signal D_en is deactivated after the third time interval and only reactivated after the counter C again exceeds the threshold value of C=3 in the fourth time interval.

The duration of the time intervals and/or the threshold values for the counter C may be suitably selected and adjusted. For example, the duration of the time intervals may be about 5 s. It is to be understood, that the number of data packets in a time interval may actually be significantly larger than illustrated in the figures.

The above-mentioned rate-based evaluation is particularly suitable to recognize types of DoS or DDoS attack, for which an evaluation merely on the basis of the firewall table is too rigid. By way of example, this is the case for a SYN flood, a Smurf attack, a Teardrop attack, or an IP spoofing attack.

Although the foregoing embodiments of the invention have been described with respect to a router apparatus and a router chip for handling IPv4 and IPv6 data packets, the invention is not limited thereto. In particular, the concepts of the invention may also be applied to other types of networking protocols which are susceptible to DoS or DDoS attacks. Also, the detailed implementation of the router chip may be varied. For example, instead of having a firewall circuit for each of the network interface circuits between the network interface circuits and the data bus, the firewall circuit could be provided between the CPU and the data bus. Further, a router apparatus could be implemented by using only on-chip memory of the router chip or by using only external memory.

What is claimed is:

1. A device, comprising:
   a router chip comprising a central processing unit,
      a plurality of network interface circuits, and
      firewall circuitry coupled between the plurality of interface circuits and the central processing unit, the firewall circuit configured to selectively block network traffic,
      wherein the firewall circuitry comprises a network protocol parser configured to analyze data packets of incoming network traffic,
      wherein further the network protocol parser is configured to analyze the data packets according to at least one multi-layer networking protocol,
      wherein the networking protocol is of the IPv4 type or of the IPv6 type, and
      wherein the network protocol parser is configured to analyze the data packets up to the third layer of the multi-layer networking protocol and selectively block data packets based thereon.

2. The device according to claim 1, wherein the central processing unit and the network interface circuits are coupled to a data bus, and wherein the firewall circuitry comprises a plurality of firewall circuits each coupled between one of the network interface circuits and the data bus.

3. The device according to claim 2, wherein the firewall circuitry is configured to receive data packets of incoming network traffic and selectively forward a received data packet or discard the received data packet.

4. The device according to claim 1, wherein the network protocol parser is configured to analyze the data packets with respect to MAC address, IP address, port number, and/or packet header content.

5. The device according to claim 1, comprising a memory controller configured to access a memory when storing and/or retrieving processing data of the central processing unit and/or firewall table data of the firewall circuitry.

6. The device according to claim 1, wherein the network protocol parser is configured to determine predefined portions of data packets, and
wherein the firewall circuitry is configured to evaluate the predetermined portions of the data packets so as to determine if a received data packet matches a predefined firewall constraint.

7. The device according to claim 6, wherein the firewall circuitry is configured to discard a data packet if the data packet matches the predefined firewall constraint.

8. The device according to claim 6, wherein the firewall circuitry is configured to process the data packets in accordance with each of a plurality of types of matching firewall constraint.

9. The device according to claim 1, wherein the firewall circuitry comprises a table search unit configured to compare predefined portions of the data packets with entries of a firewall table so as to determine if the received data packet matches a predefined firewall constraint.

10. The device according to claim 1, wherein the firewall circuitry comprises a rate-based evaluation unit configured to count, in a predefined time interval, a number of data packets matching a predefined firewall constraint so as to determine a count of matching data packets, and
wherein the firewall device is configured to control said selective blocking of network traffic depending on the count of matching data packets.

11. The device according to claim 10, wherein the firewall circuitry is configured to discard a data packet if the data packet matches the predefined firewall constraint and if the count of matching data packets in a presently evaluated time interval exceeds a predetermined threshold.

12. The device according to claim 10, wherein the firewall circuitry is configured to discard a data packet if the data packet matches the predefined firewall constraint and if the count of matching data packets in a previously evaluated time interval exceeds a predetermined threshold.

13. The device according to claim 10, wherein the firewall circuitry is configured to discard a data packet if the data packet matches the predefined firewall constraint and if the count of matching data packets in the presently evaluated time interval exceeds a predetermined threshold or the count of matching data packets in the previously evaluated time interval exceeds a predetermined threshold.

14. The device according to claim 10, wherein the rate-based evaluation unit is further configured to evaluate a separate count of matching data packets each of a plurality of predefined firewall constraints.

15. The device according to claim 1, wherein the firewall circuitry comprises internal memory configured to store firewall table data of the firewall circuitry.

16. A method of selectively blocking network traffic, said method comprising:
providing a router chip comprising a central processing unit and a plurality of network interface circuits;
providing a firewall circuitry coupled between the plurality of network interfaces and the central processing unit;
receiving incoming data packets from the network interface circuits in the firewall circuitry;
analyzing the data packets according to at least one of an IPv4 or IPv6 type multi-layer networking protocol, wherein the analyzing is executed up to a third layer of the multi-layer networking protocol; and
selectively discarding a received data packet.

17. The method according to claim 16, comprising:
analyzing the received data packets to determine predefined portions of the data packets, and
evaluating the predefined portions of the data packets so as to determine if a received data packet matches a predefined firewall constraint.

18. The method according to claim 17, comprising:
comparing the predefined portions of the data packets with entries of a firewall table so as to determine if the received data packet matches the predefined firewall constraint.

19. The method according to claim 17, comprising:
counting the number of data packets which in a predefined time interval match the firewall constraint so as to determine a count of matching data packets, and
controlling said selective forwarding and discarding of data packets depending on the count of matching data packets.

20. The method according to claim 19, comprising:
discarding a data packet if the data packet matches the predefined firewall constraint and if the count of matching data packets in the presently evaluated time interval exceeds a predetermined threshold.

21. The method according to claim 19, comprising:
discarding a data packet if the data packet matches the predefined firewall constraint and if the count of matching data packets in the previously evaluated time interval exceeds a predetermined threshold.

22. The method according to claim 19, comprising:
discarding a data packet if the data packet matches the predefined firewall constraint and if the count of matching data packets in the presently evaluated time interval exceeds a predetermined threshold or the count of matching data packets in the previously evaluated time interval exceeds a predetermined threshold.

23. The method according to claim 19, comprising:
providing a plurality of predefined firewall constraints, and
evaluating the count of matching data packets for each of the predefined firewall constraints.

24. The method according to claim 17, comprising:
discarding a data packet if the data packet matches the predefined firewall constraint.

25. The method according to claim 17, comprising:
providing a plurality of predefined firewall constraints, and
processing the received data packet according to the type of matching firewall constraint.

26. The method according to claim 16, comprising:
storing firewall table data of the firewall circuitry in an internal memory of the firewall circuitry.

27. The method according to claim 16, comprising:
forwarding a data packet which was not discarded to the central processing unit, and
analyzing the data packet in the central processing unit so as to determine if the data packet is an attacking data packet, and
selectively forwarding or discarding the data packet on the basis of the analysis.

28. The method according to claim 27, comprising:
modifying a firewall table of the firewall circuitry on the basis of the analysis.

29. An arrangement, comprising:
a router chip and a memory coupled to the router chip,
wherein the router chip comprises:
a central processing unit,
a plurality of network interface circuits, and
a firewall circuitry coupled between the central processing unit and the plurality of network interfaces to selectively block network traffic,
wherein the firewall circuitry comprises a network protocol parser configured to analyze data packets of incoming network traffic to determine predefined portions of the data packets,
wherein further the network protocol parser is configured to analyze the data packets according to at least one multi-layer networking protocol,
wherein the networking protocol is of the IPv4 type or of the IPv6 type, and
wherein the network protocol parser is configured to analyze the data packets up to the third layer of the multi-layer networking protocol.

30. The arrangement according to claim 29, wherein the firewall circuitry further comprises:
a table search unit configured to compare the predefined portions of the data packets with entries of a firewall table to determine if the received data packet matches a predefined firewall constraint; and
a rate-based evaluation unit configured to count, in a predefined time interval, a number of data packets matching the predefined firewall constraint so as to determine a count of matching data packets,
wherein the firewall circuitry is configured to control said selective blocking of network traffic depending on the count of matching data packets.

31. The arrangement according to claim 29, wherein the memory stores processing data of the central processing unit and firewall table data of the firewall circuitry.

* * * * *